United States Patent
Maeyama et al.

(10) Patent No.: US 9,452,763 B2
(45) Date of Patent: Sep. 27, 2016

(54) GUIDE-RAIL TRACK VEHICLE, AND METHOD FOR CHANGING DISTANCE BETWEEN GUIDANCE WHEELS

(71) Applicant: MITSUBISHI HEAVY INDUSTRIES, LTD., Tokyo (JP)

(72) Inventors: Hiroyuki Maeyama, Tokyo (JP); So Tamura, Tokyo (JP); Kousuke Katahira, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 14/762,453

(22) PCT Filed: Feb. 21, 2013

(86) PCT No.: PCT/JP2013/054319
§ 371 (c)(1),
(2) Date: Jul. 21, 2015

(87) PCT Pub. No.: WO2014/128878
PCT Pub. Date: Aug. 28, 2014

(65) Prior Publication Data
US 2015/0353106 A1    Dec. 10, 2015

(51) Int. Cl.
*B61F 7/00* (2006.01)
*F16H 25/24* (2006.01)
(Continued)

(52) U.S. Cl.
CPC ............... *B61F 7/00* (2013.01); *B61B 13/00* (2013.01); *B62D 1/265* (2013.01); *F16H 25/24* (2013.01); *F16H 2025/209* (2013.01); *Y10T 74/18792* (2015.01)

(58) Field of Classification Search
CPC ....... B61B 10/04; B61B 13/00; B61B 13/04; E01B 7/00; E01B 25/00; E01B 25/28; E01B 25/12; E01B 25/06; B61F 5/38; B61F 9/00; B61F 7/00; B62D 1/265
USPC .................................. 105/72.2, 215.1, 215.2
See application file for complete search history.

(56) References Cited

U.S. PATENT DOCUMENTS 4,299,172 A * 11/1981 Dawson ................. B62D 1/265
  104/244.1
7,624,685 B2 * 12/2009 Andreasson ............ E01B 25/00
  104/130.01

(Continued)

FOREIGN PATENT DOCUMENTS

JP    52-18619 A    2/1977
JP    62-27870 U    2/1987

(Continued)

OTHER PUBLICATIONS
International Search Report mailed May 14, 2013, corresponding to International patent application No. PCT/JP2013/054319.

(Continued)

*Primary Examiner* — Jason C Smith
(74) *Attorney, Agent, or Firm* — Kanesaka Berner and Partners LLP

(57) ABSTRACT

This guide-rail track vehicle, which travels on a track, is provided with: a carbody disposed at the top of a vehicle; and a running device that supports the carbody from below, and has a guide frame to which at least a pair of guide wheels, which are guided by a guide rail disposed on the track, are attached. Moreover, the guide frame has: a pair of beam members that are capable of sliding in the width direction of the track, and to which the guide wheels are attached; a rotating part capable of rotating around a first axis in the direction of travel; and a transmission part that converts the rotation of the rotating part to motion in the width direction, and moves the guide wheels in a symmetrical fashion by synchronizing the pair of beam members. Thus, the guide-rail track vehicle has a running device that allows the distance between the guide wheels to be changed.

7 Claims, 9 Drawing Sheets

(51) Int. Cl.
*B61B 13/00* (2006.01)
*B62D 1/26* (2006.01)
*F16H 25/20* (2006.01)

(56) References Cited

U.S. PATENT DOCUMENTS

| | | | | |
|---|---|---|---|---|
| 8,074,577 | B2* | 12/2011 | Morichika | B61B 10/001 104/130.09 |
| 8,408,142 | B2* | 4/2013 | Maeyama | B61B 13/00 104/242 |
| 8,561,547 | B2* | 10/2013 | Shiroyama | B62D 1/265 104/119 |
| 8,978,562 | B2* | 3/2015 | Nagamine | B61B 13/04 104/91 |
| 2008/0083345 | A1* | 4/2008 | Morita | E01B 25/28 104/106 |
| 2009/0259352 | A1* | 10/2009 | Morichika | B61B 10/04 701/19 |
| 2009/0288575 | A1* | 11/2009 | Morichika | B62D 1/265 104/139 |
| 2010/0100267 | A1* | 4/2010 | Morichika | B62D 1/265 701/23 |
| 2011/0265683 | A1* | 11/2011 | Kurahashi | B61B 10/04 105/215.2 |
| 2011/0271868 | A1* | 11/2011 | Kurahashi | B61B 10/04 105/141 |
| 2012/0017800 | A1* | 1/2012 | Kurahashi | B61B 10/04 105/182.1 |
| 2012/0031298 | A1* | 2/2012 | Kurahashi | B61B 10/04 105/215.2 |
| 2012/0097065 | A1* | 4/2012 | Maeyama | B62D 1/265 105/177 |
| 2013/0193277 | A1* | 8/2013 | Kawauchi | E01B 25/28 246/415 R |
| 2013/0193278 | A1* | 8/2013 | Yanobu | E01B 25/28 246/415 R |
| 2014/0290525 | A1* | 10/2014 | Maeyama | E01B 25/28 104/242 |
| 2015/0314796 | A1* | 11/2015 | Maeyama | B61B 13/04 701/19 |
| 2015/0353104 | A1* | 12/2015 | Maeyama | B61B 13/00 701/19 |
| 2015/0353106 | A1* | 12/2015 | Maeyama | B62D 1/265 74/89.14 |
| 2016/0052529 | A1* | 2/2016 | Tachibana et al. | B61B 13/00 105/215.1 |

FOREIGN PATENT DOCUMENTS

| | | |
|---|---|---|
| JP | 64-56276 A | 3/1989 |
| JP | 4-372466 A | 12/1992 |
| JP | 5-338534 A | 12/1993 |
| JP | 10-156491 A | 6/1998 |
| JP | 2003-104198 A | 4/2003 |
| JP | 2003-146204 A | 5/2003 |
| JP | 2012-188241 A | 10/2012 |
| JP | 2013-18216 A | 1/2013 |
| WO | 98/15444 A1 | 4/1998 |

OTHER PUBLICATIONS

Written Opinion mailed May 14, 2013, corresponding to International patent application No. PCT/JP2013/054319.
Office Action in JP Patent Application No. 2015-501151, mailed Aug. 16, 2016.

* cited by examiner

GUIDE-RAIL TRACK VEHICLE, AND METHOD FOR CHANGING DISTANCE BETWEEN GUIDANCE WHEELS

RELATED APPLICATIONS

The present application is a National Phase of International Application Number PCT/JP2013/054319, filed Feb. 21, 2013.

TECHNICAL FIELD

The present invention relates to a guide-rail track vehicle which travels on a track, and a method for changing the distance between guide wheels provided in a guide-rail track vehicle.

BACKGROUND ART

As new transportation means other than a bus or a railway, a track transportation system is known in which a vehicle travels on a track with running wheels which are rubber tires while guide wheels of the vehicle are guided by guide rails. Such a track transportation system is generally called a new transportation system or an automated people mover (APM).

Further, in this type of new transportation system, there were once times in which a clear standard is not defined in a width dimension of the track, and even today, the track laid at this time is used, and therefore, tracks having various width dimensions are present.

Therefore, in various different tracks in this manner, the distance between the right and left guide rails also becomes different, and thus when manufacturing a vehicle, it is necessary to set the distance between the right and left guide wheels according to the distance between the guide rails.

Here, PTL 1 discloses a vehicle in which the distance between the right and left guide wheels can be changed by extending and contracting a guide bar supporting the guide wheels by a cylinder.

CITATION LIST

Patent Literature

[PTL 1] Japanese Unexamined Patent Application Publication No. 4-372466

SUMMARY OF INVENTION

Technical Problem

However, in the technique of PTL 1, since the distance between the guide wheels is changed by using the cylinder, a force in an extension and contraction direction is weak, and if a pushing force toward the inside in a width direction from a track acts on the guide wheels, the distance between the guide wheels changes, and thus it is difficult to completely fix the positions of the guide wheels. Further, in order to oppose such a force pushing the guide wheel, it is necessary to separately provide a mechanism for locking the cylinder.

The present invention provides a guide-rail track vehicle in which the distance between guide wheels can be easily changed and the positions of the guide wheels can be reliably fixed, and a method for changing the distance between guide wheels provided in a guide-rail track vehicle.

Solution to Problem

According to a first aspect of the present invention, there is provided a guide-rail track vehicle which travels on a track, including: a carbody which is disposed at an upper portion of a vehicle; and a running device which supports the carbody from below and has a guide frame on which at least a pair of guide wheels that are guided by a guide rail provided at the track are mounted, wherein the guide frame has a pair of beam members which can slide in a width direction of the track and on which the respective guide wheels are mounted, a rotating part capable of rotating around a first axis along a traveling direction, and a transmission part which converts rotation of the rotating part into movement in the width direction and symmetrically moves the guide wheels by synchronizing the pair of beam members.

According to such a guide-rail track vehicle, the rotating force along the traveling direction by the rotating part is converted into the movement in the width direction in the transmission part, which is then transmitted to the beam members, and therefore, even if a load from the guide wheel acts on the beam member in the width direction, the beam member does not easily move by the acting force, and thus it is possible to reliably fix the distance between the guide wheels at the time of traveling. In addition, due to moving the pair of beam members in synchronization, the positions of the guide wheels do not become asymmetric in the width direction, and therefore, there is no case where the running device leans to one side, whereby a load which is received from the track during curve traveling or the like becomes unbalanced, and stable traveling becomes possible, and this also leads to improvement in ride quality.

Further, in a guide-rail track vehicle according to a second aspect of the present invention, the transmission part in the first aspect described above may have a first gear which is fixed to the rotating part and can rotate around the first axis, a second gear which meshes with the first gear, thereby rotating around a second axis along the width direction according to rotation of the first gear, and a rod which is fixed to the second gear, extends in the width direction, has first threaded portions formed on sides of both end portions, and rotates along with the second gear, and in each of the pair of beam members, a second threaded portion which is screwed to the first threaded portion may be formed such that the pair of beam members come close to each other if the rod rotates to one side in a state where the first threaded portion is screwed and that the pair of beam members are spaced apart from each other if the rod rotates to the other side.

In such a guide-rail track vehicle, the transmission part converts a rotating force into movement in the width direction by the first gear and the second gear and is a mechanism of moving the beam member by the thread-engagement of the first threaded portion with the second threaded portion, and therefore, the transmission part is strong against a load from the width direction, and thus it is possible to more reliably fix the distance between the guide wheels. Further, in this manner, the transmission part is a mechanical mechanism, and therefore, it is possible to reliably operate the pair of beam members in synchronization.

Further, in a guide-rail track vehicle according to a third aspect of the present invention, the first gear in the second aspect described above may be a worm gear and the second gear may be a worm wheel.

In this manner, rotation is converted into movement in the width direction by the meshing of the worm gear with the worm wheel, and therefore, by appropriately selecting the twisting angle of the worm gear, it is possible to prevent inverse rotation when a load from the width direction acts on the beam member, and therefore, the transmission part is strong against a load from the width direction, and thus it is possible to more reliably fix the distance between the guide wheels. Further, in this manner, the transmission part is a mechanical mechanism, and therefore, it is possible to reliably operate the pair of beam members in synchronization.

In addition, in a guide-rail track vehicle according to a fourth aspect of the present invention, the transmission part in the first aspect described above may have a rod which is fixed to the rotating part and can rotate around the first axis and in which a threaded portion is formed, and a link member mounted on the rod, and the link member may have a pair of first supporting sections which are screwed to the threaded portion, are disposed to be spaced apart from each other in the traveling direction, and come close to each other if the rod rotates to one side and are spaced apart from each other if the rod rotates to the other side, a pair of second supporting sections respectively fixed to the pair of beam members on both sides in the width direction, a first connecting section which connects the first supporting section on one side and the second supporting section on one side and is provided so as to be able to relatively rotate with an axis along an orthogonal direction orthogonal to the traveling direction and the width direction as the center, between the first supporting section on one side and the second supporting section on one side, a second connecting section which connects the first supporting section on the other side and the second supporting section on one side and is provided so as to be able to relatively rotate with an axis along the orthogonal direction as the center, between the first supporting section on the other side and the second supporting section on one side, a third connecting section which connects the first supporting section on one side and the second supporting section on the other side and is provided so as to be able to relatively rotate with an axis along the orthogonal direction as the center, between the first supporting section on one side and the second supporting section on the other side, and a fourth connecting section which connects the first supporting section on the other side and the second supporting section on the other side and is provided so as to be able to relatively rotate with an axis along the orthogonal direction as the center, between the first supporting section on the other side and the second supporting section on the other side.

In such a guide-rail track vehicle, in the transmission part, if the rod rotates, whereby the pair of first supporting sections come close to each other, the first connecting section and the second connecting section operate such that an angle formed between the first connecting section and the second connecting section at the second supporting section is reduced, while relatively rotating between the first supporting section and the second supporting section. Therefore, the second supporting section moves so as to be pushed out toward the outside in the width direction by the first connecting section and the second connecting section, and therefore, the beam member is moved in the width direction. On the other hand, if the rod rotates, whereby the pair of first supporting sections are spaced apart from each other, the first connecting section and the second connecting section operate such that an angle formed between the first connecting section and the second connecting section at the second supporting section increases, while relatively rotating between the first supporting section and the second supporting section. Therefore, the second supporting section moves so as to be pulled toward the inside in the width direction by the first connecting section and the second connecting section, and therefore, the beam member is moved to the inside in the width direction. Further, the same applies to movement in the third connecting section and the fourth connecting section. As a result, since the rotation of the rod is converted into movement in the width direction through the link member, the transmission part is strong against a load from the width direction, and thus it is possible to more reliably fix the distance between the guide wheels. Further, in this manner, due to an operation with a mechanical mechanism using the link member, it is possible to reliably operate the pair of beam members in synchronization.

Further, in a guide-rail track vehicle according to a fifth aspect of the present invention, the rotating part in any one of the first and fourth aspects described above may have an electric motor which supplies power to the transmission part, a signal output section which outputs a signal when the movement of the guide wheels is required, and a control unit which controls of an operation of the electric motor according to the signal from the signal output section.

According to such a guide-rail track vehicle, the electric motor is used in the rotating part, whereby it becomes possible to easily move the guide wheels, and since a remote operation of the electric motor is also possible, it becomes possible to move the guide wheels at a desired timing.

Further, according to a sixth aspect of the present invention, there is provided a method for changing a distance between guide wheels, which is for changing the distance between at least a pair of guide wheels which are mounted on a running device, which supports a carbody disposed at an upper portion of a guide-rail track vehicle travelling on a track from below, are guided by a guide rail provided at the track, and provided so as to be able to slide in a width direction of the track, the method including: a rotating force applying process of applying a rotating force around a first axis along a traveling direction of the running device; a rotating force conversion process of converting the rotating force into a force in the width direction; and a guide wheel moving process of symmetrically moving the pair of guide wheels in the width direction in synchronization by the force in the width direction.

According to such a method for changing a distance between guide wheels, the rotating force along the traveling direction is converted into the force in the width direction, and therefore, even if a load acts on the guide wheel in the width direction, the guide wheel does not easily move by the acting force, and thus it is possible to reliably fix the distance between the guide wheels at the time of traveling. In addition, due to moving the pair of guide wheels in synchronization, the positions of the guide wheels do not become asymmetric in the width direction, and thus stable traveling becomes possible, and this also leads to improvement in ride quality.

Further, with respect to a method for changing a distance between guide wheels according to a seventh aspect of the present invention, in the rotating force conversion process in the sixth aspect described above, the rotating force may be converted into the force in the width direction by using a first gear which is provided in the running device and can rotate around the first axis, a second gear which meshes with the first gear, thereby rotating around a second axis along the width direction according to rotation of the first gear, a rod which is fixed to the second gear, extends in the width direction, has first threaded portions formed on sides of both end portions, and rotates along with the second gear, and a pair of beam members on which the pair of guide wheels are respectively mounted, and in each of which a second threaded portion which is screwed to the first threaded portion is formed such that the pair of guide wheels come close to each other if the rod rotates to one side in a state where the first threaded portion is screwed and that the pair of guide wheels are spaced apart from each other if the rod rotates to the other side.

In such a method for changing a distance between guide wheels, the rotating force is converted into the force in the width direction by the first gear and the second gear, and in addition, since a beam member moving mechanism is a mechanism of moving the beam member by the thread-engagement of the first threaded portion with the second threaded portion, it is strong against a load from the width direction, and thus it is possible to more reliably fix the distance between the guide wheels. Further, in this manner, in the rotating force conversion process, a force is converted by using a mechanical mechanism, and therefore, it is possible to reliably operate the pair of beam members and the pair of guide wheels in synchronization.

Further, with respect to a method for changing a distance between guide wheels according to an eighth aspect of the present invention, in the rotating force conversion process in the sixth aspect described above, the rotating force may be converted into the force in the width direction by using a rod which is provided in the running device and can rotate around the first axis and in which a threaded portion is formed, a pair of first supporting sections which are mounted on the rod so as to be screwed to the threaded portion, are disposed to be spaced apart from each other in the traveling direction, and come close to each other if the rod rotates to one side and are spaced apart from each other if the rod rotates to the other side, a pair of second supporting sections respectively fixed to a pair of beam members, on which the pair of guide wheels are respectively mounted, on both sides in the width direction, a first connecting section which connects the first supporting section on one side and the second supporting section on one side and is provided so as to be able to relatively rotate with an axis along an orthogonal direction orthogonal to the traveling direction and the width direction as the center, between the first supporting section on one side and the second supporting section on one side, a second connecting section which connects the first supporting section on the other side and the second supporting section on one side and is provided so as to be able to relatively rotate with an axis along the orthogonal direction as the center, between the first supporting section on the other side and the second supporting section on one side, a third connecting section which connects the first supporting section on one side and the second supporting section on the other side and is provided so as to be able to relatively rotate with an axis along the orthogonal direction as the center, between the first supporting section on one side and the second supporting section on the other side, and a fourth connecting section which connects the first supporting section on the other side and the second supporting section on the other side and is provided so as to be able to relatively rotate with an axis along the orthogonal direction as the center, between the first supporting section on the other side and the second supporting section on the other side.

In such a method for changing a distance between guide wheels, if the rod rotates, whereby the pair of first supporting sections come close to each other, the first connecting section and the second connecting section operate such that an angle formed between the first connecting section and the second connecting section at the second supporting section is reduced. Therefore, the second supporting section moves so as to be pushed out toward the outside in the width direction by the first connecting section and the second connecting section, and therefore, the beam member and the guide wheel are moved in the width direction. On the other hand, if the rod rotates, whereby the pair of first supporting sections are spaced apart from each other, the first connecting section and the second connecting section operate such that an angle formed between the first connecting section and the second connecting section at the second supporting section increases. Therefore, the second supporting section moves so as to be pulled toward the inside in the width direction by the first connecting section and the second connecting section, and therefore, the beam member and the guide wheel are moved to the inside in the width direction. Further, the same applies to movement in the third connecting section and the fourth connecting section. As a result, since the rotation force of the rod is converted into a force in the width direction, a beam member moving mechanism is strong against a load from the width direction, and thus it is possible to more reliably fix the distance between the guide wheels. Further, in this manner, due to an operation with a mechanical mechanism, it is possible to reliably operate the pair of beam members and the pair of guide wheels in synchronization.

Further, with respect to a method for changing a distance between guide wheels according to a ninth aspect of the present invention, in the rotating force applying process in any one of the sixth to eighth aspects described above, the rotating force may be applied by using an electric motor which supplies rotation power around the first axis, and a control unit which controls an operation of the electric motor according to a signal from a signal output section which outputs the signal when the movement of the guide wheels is required.

In such a method for changing a distance between guide wheels, the electric motor is used, whereby it becomes possible to easily move the guide wheels, and since a remote operation of the electric motor is also possible, it becomes possible to move the guide wheels by applying a rotating force at a desired timing.

Advantageous Effects of Invention

According to the guide-rail track vehicle and the method for changing a distance between guide wheels related to the present invention, by using the transmission part for converting rotational movement into linear movement in the width direction, it is possible to easily change the distance between the guide wheels and reliably fix the positions of the guide wheels.

DESCRIPTION OF EMBODIMENTS

First Embodiment

Hereinafter, a guide-rail track vehicle 1 (hereinafter referred to simply as a vehicle 1) according to a first embodiment of the present invention will be described.

Figure 1:
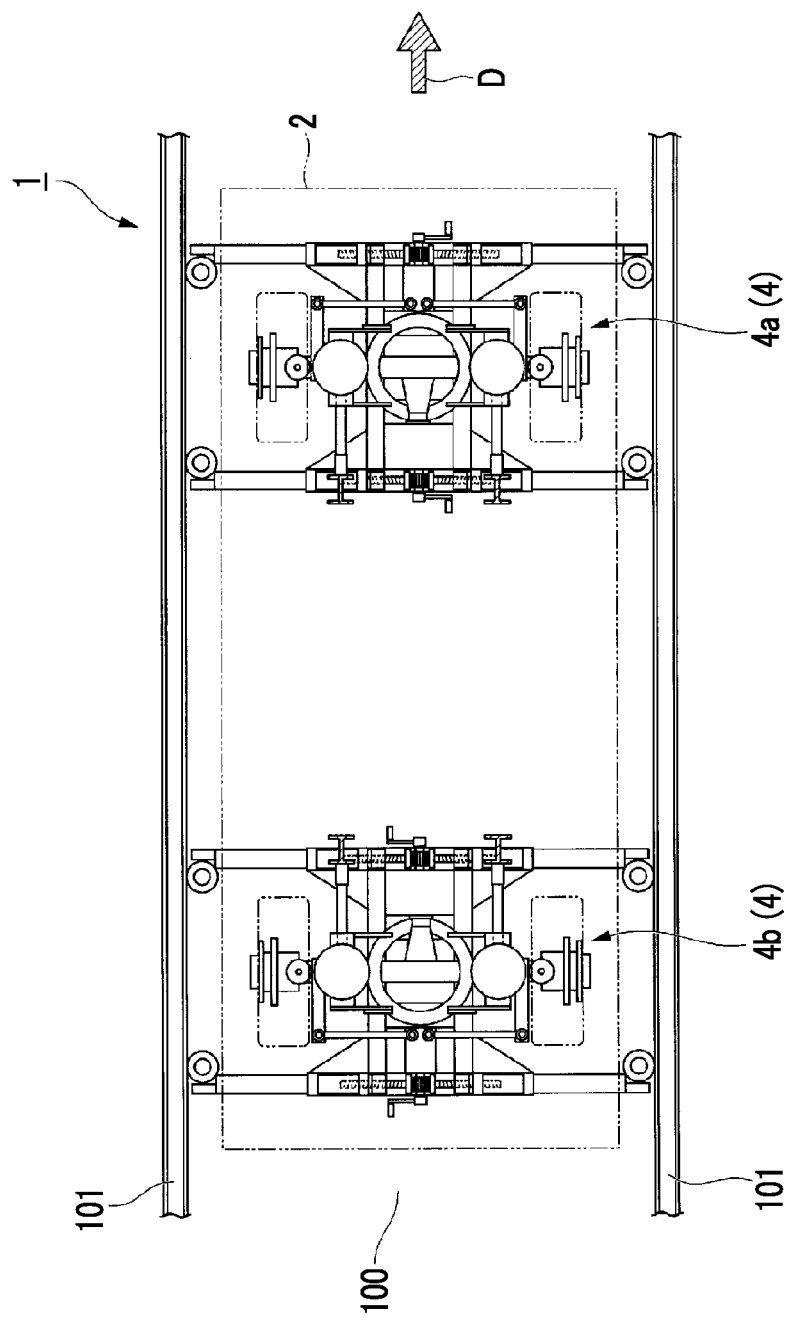
FIG. 1 is a top view showing a guide-rail track vehicle according to a first embodiment of the present invention.

As shown in FIG. 1, the vehicle 1 is the vehicle 1 of a new transportation system, which travels on a track 100 while being guided by a guide rail 101 provided at the track 100. In this embodiment, the vehicle 1 is a vehicle in a lateral guide rail type transportation system in which the guide rails 101 are provided on both sides on the outside in a width direction of the track 100.

The vehicle 1 is provided with a carbody 2 which is disposed on the upper side and accommodates passengers, and a pair of running devices 4 provided at a distance in a front-back direction (a direction along a traveling direction of the vehicle 1) of the carbody 2 at a lower portion of the carbody 2, as shown in FIG. 1.

Here, the vehicle 1 travels in a direction (a rightward direction in the plane of FIG. 1) shown by an arrow D in FIG. 1. In the following, the front side and the back side toward the traveling direction of the vehicle 1 are respectively referred to as the front and the back, and the right side and the left side are respectively referred to as the right and the left. Further, the width direction of the track 100 is referred to simply as a width direction.

Next, the running devices 4 will be described.

Figure 2:
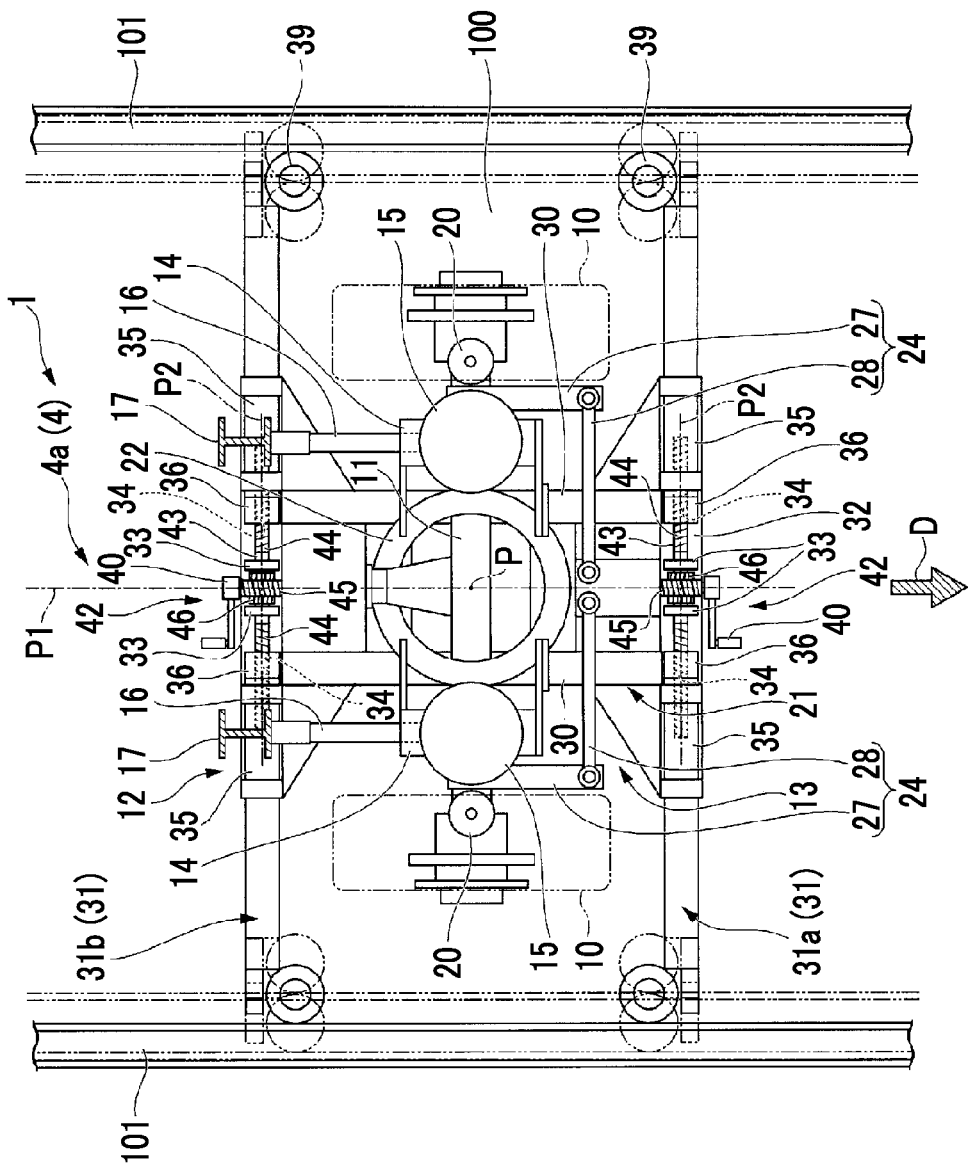
FIG. 2 is related to the guide-rail track vehicle according to the first embodiment of the present invention and is a top view showing a running device.
Figure 3:
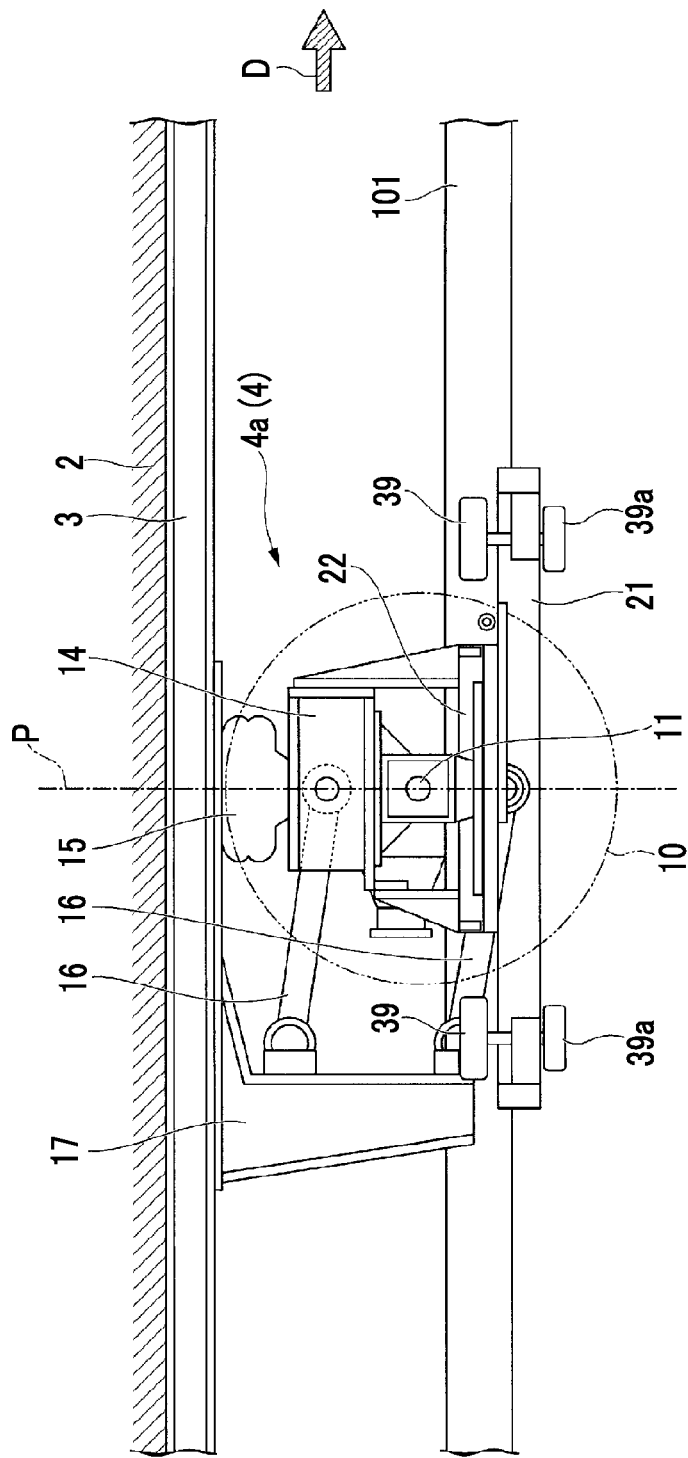
FIG. 3 is related to the guide-rail track vehicle according to the first embodiment of the present invention and is a side view showing the running device.
Figure 4:
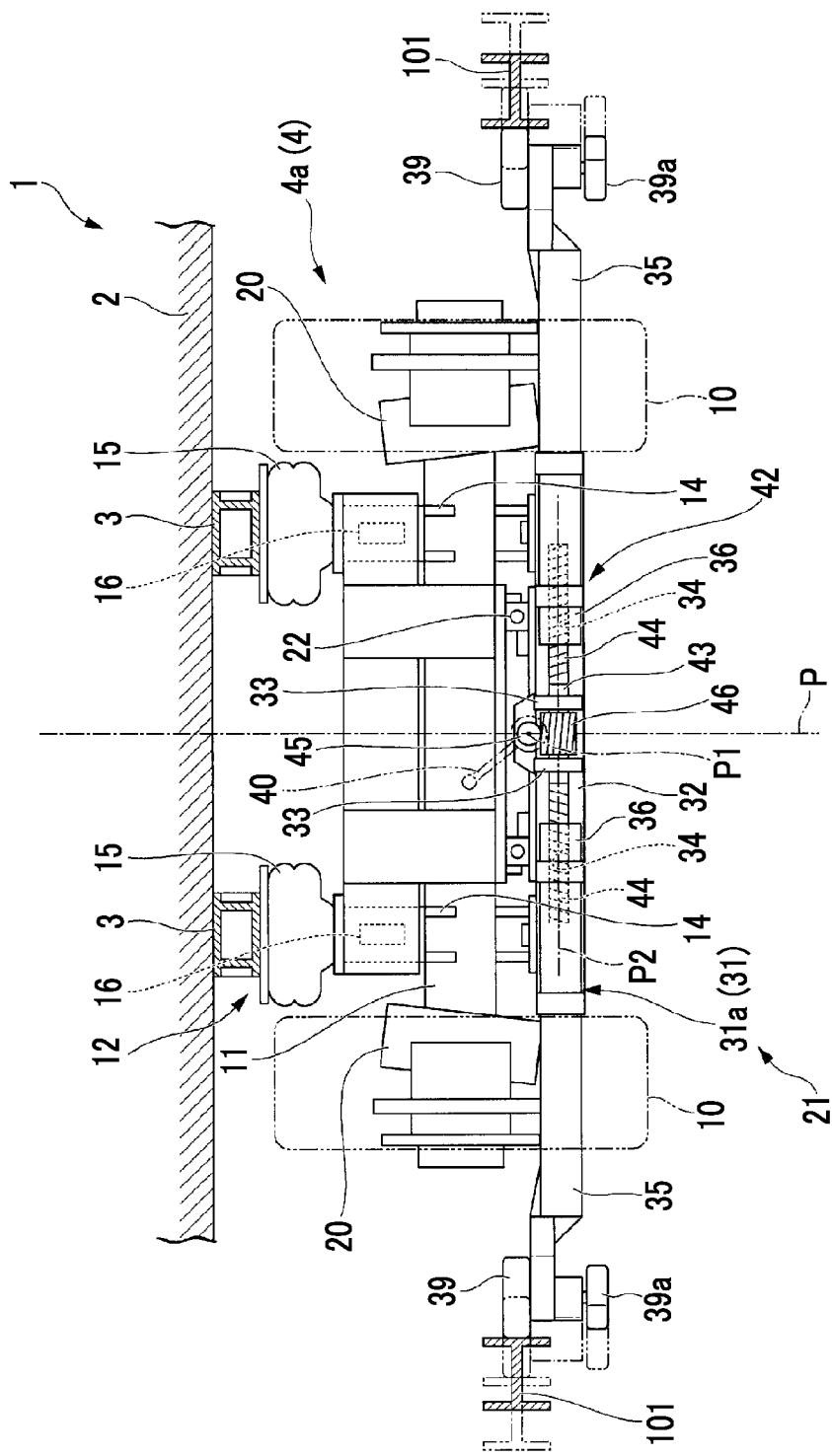
FIG. 4 is related to the guide-rail track vehicle according to the first embodiment of the present invention and is a front view showing the running device.

As shown in FIGS. 2 to 4, each of the running devices 4 is provided with a pair of right and left running wheels 10, an axle 11 which connects the running wheels 10, a suspension device 12 which supports the axle 11, and a steering guide device 13 which steers the running wheels 10. In addition, a running device 4a on the front side and a running device 4b on the back side have the same configuration except that the front-back direction is reversed, and therefore, in the following, the running device 4a on the front side will be described as a representative.

The suspension device 12 has a spring receiver 14 rigidly joined to the axle 11, a pair of right and left air springs 15 disposed between the spring receiver 14 and an underframe 3 of the carbody 2, a plurality of (in this embodiment, four) links 16 which support the spring receiver 14 so as to be displaceable up and down, and a suspension frame 17 disposed between the link 16 and the underframe 3 of the carbody 2.

The air spring 15 is attached, at an upper end portion thereof, to the underframe 3 of the carbody 2 and attached, at a lower end portion thereof, to an upper end of the spring receiver 14. The relative up-and-down vibration of the running wheel 10 and the axle 11 with respect to the carbody 2 is relieved by the air spring 15.

The suspension frame 17 is fixed to the underframe 3 of the carbody 2 so as to be located on the back side of the spring receiver 14. In addition, in the running device 4b on the back side, the suspension frame 17 is located on the front side of the spring receiver 14, because the front-back direction is reverse to the running device 4a on the front side, as described above.

The links 16 are arranged parallel to each other on the top and bottom and the right and left and each connect the suspension frame 17 and the spring receiver 14. Further, an end portion on one side of each of the links 16 is pin-connected to the suspension frame 17 and an end portion on the other side of each of the links 16 is pin-connected to the spring receiver 14. That is, the suspension frame 17, the spring receiver 14, and the links 16 configure a parallel link mechanism. For this reason, the spring receiver 14 can move up and down without changing a direction with respect to the suspension frame 17. Further, the links 16 also function as traction rods for transmitting the driving forces or the deceleration forces of the running wheels 10 to the carbody 2.

The steering guide device 13 has kingpins 20 provided at the respective running wheels 10, a guide frame 21 (a guide frame) disposed at a lower portion of the spring receiver 14, a center bearing 22 which supports the guide frame 21 so as to be able to turn around a center axis P perpendicular to the floor surface of the carbody 2, and a steering link mechanism 24 which changes the steering angles of the running wheels 10 in conjunction with the turning around the center axis P of the guide frame 21. In addition, in FIGS. 3 and 4, the steering link mechanism 24 is omitted in order to make these drawings easy to see.

The center bearing 22 is disposed between the pair of spring receivers 14 and the guide frame 21 in a vertical direction. The center bearing 22 has an inner ring and an outer ring, and one of the inner ring and the outer ring is fixed to lower portions of the pair of spring receivers 14 and the other of the inner ring and the outer ring is fixed to an upper portion of the guide frame 21. Further, the center in the front and back and the right and left of the guide frame 21 is located on the center axis P.

Here, the center axis P is an axis perpendicular to the floor surface of the carbody 2, as described above, and is an axis passing through the center in an extending direction of the axle 11, that is, the intermediate position between the pair of right and left running wheels 10. Here, a direction parallel to the center axis P is referred to as an orthogonal direction.

The kingpin 20 is a member serving as a steering shaft of the running wheel 10.

The steering link mechanism 24 has a steering arm 27 which swings integrally with the running wheel 10 with the kingpin 20 as a rotation center, and a steering rod 28 which connects the steering arm 27 and the guide frame 21. Then, the steering rod 28 is pin-connected to an end portion of the steering arm 27 at an end portion on one side and pin-connected to the guide frame 21 at an end portion on the other side. Accordingly, if the guide frame 21 turns with the center axis P as the center, the steering rod 28 is displaced according to the turning and the steering arm 27 and the running wheel 10 rotate with the kingpin 20 as the center due to the displacement, and thus the running wheel 10 is steered.

Next, the guide frame 21 will be described.

The guide frame 21 has a pair of longitudinal beams 30 extending in the traveling direction, and a pair of cross beams 31 extending in the width direction and disposed so as to interpose the running wheels 10 therebetween from the front and the back, and is configured by assembling these beams in a grid pattern. Then, each of the cross beams 31 has a center beam 32 disposed at the center in the right and left in the width direction and fixed to the longitudinal beams 30, and a pair of end beams 35 (beam members) mounted on the right and left of the center beam 32.

The center beam 32 has a tubular shape which is partially open at an upper portion, and supports the pair of end beams 35 by inserting the end beams 35 therethrough from the right and the left in the width direction.

The end beam 35 has a rod shape and is made so as to be able to relatively slide to right and left in the width direction with respect to the center beam 32. Further, a guide wheel 39 is mounted on an end portion on the outside in the width direction of each of the end beams 35.

The guide wheel 39 rolls in contact with the above-described guide rail 101 with an axis extending in the orthogonal direction as the center. Here, in this embodiment, the guide wheels 39 are provided by two on each of the right and the left, thereby configuring two pairs of right and left guide wheels 39 per one running device 4.

In addition, in a steering platform truck having a different structure from the running device 4 of this embodiment (a platform truck of a type in which the end beams 35 serving as a guide cross beam are provided on only the front side), the guide wheel 39 is provided by one on each of the right and the left.

In addition, a switching guide wheel 39a is provided below the guide wheel 39 and rolls in contact with a switching guide rail (not shown) provided at the track 100 at a branch section in the track 100, thereby guiding the vehicle 1 in a branch direction (refer to FIGS. 3 and 4).

Further, in the end beam 35, a female threaded portion 34 (a second threaded portion) is formed so as to extend toward the outside in the width direction from an end face on the inside in the width direction. Then, in the end beam 35 on one side, the female threaded portion 34 is made so as to be a right-hand thread, and in the end beam 35 on the other side, the female threaded portion 34 is made so as to be a left-hand thread.

In this embodiment, in the female threaded portions 34, a nut member 36 is fixed to an end portion on the inside in the width direction of the end beam 35, thereby forming the female threaded portion 34. However, the female threaded portion 34 may be directly formed in the end beam 35.

Here, the guide frame 21 further has a rotating handle 40 (a rotating part) provided at the center beam 32 and having a shaft portion which rotates around a first axis P1 along the traveling direction, and a transmission mechanism 42 (a transmission part) which converts the rotation of the rotating handle 40 into movement in the width direction and transmits the movement to the pair of end beams 35.

The transmission mechanism 42 has a rod 43 which is provided in the center beam 32 and extends to right and left in the width direction, a worm wheel 46 (a second gear) fixed to the rod 43, and a worm gear 45 (a first gear) which meshes with the worm wheel 46 and is fixed to the rotating handle 40.

The rod 43 has a rod shape having a diameter smaller than the inner diameter of the center beam 32 and penetrates through two flange portions 33 formed so as to annularly protrude from the inner surface of the center beam 32 to the inside at the center in the right and left in the width direction of the center beam 32, thereby being supported in the center beam 32 so as to be able to relatively rotate with respect to the center beam 32 around a second axis P2 along the width direction.

Further, in the rod 43, male threaded portions 44 (first threaded portions) are formed on the sides of both end portions on the outside in the width direction. Then, on the side of the end portion on one side, the male threaded portion 44 is made so as to be a right-hand thread, and on the side of the end portion on the other side, the male threaded portion 44 is made so as to be a left-hand thread. Then, each of the male threaded portions 44 is screwed to the female threaded portion 34 formed in each of the end beams 35.

The worm wheel 46 is disposed to be accommodated in the center beam 32 at the center in the right and left of the center beam 32 so as to be sandwiched between the two flange portions 33 formed at the center beam 32. Further, the worm wheel 46 is fixed to the rod 43 in a state where the rod 43 penetrates therethrough, thereby being able to relatively rotate with respect to the center beam 32 with the second axis P2 as the center, along with the rod 43. Here, an upper portion of the center beam 32 is open at the position between the two flange portions 33 of the center beam 32 where the worm wheel 46 is provided.

The worm gear 45 is disposed above the worm wheel 46 and meshes with the worm wheel 46. Then, the worm gear 45 is made so as to be able to rotate around the first axis P1 along the traveling direction orthogonal to the second axis P2 which is the rotation center of the worm wheel 46. In this embodiment, the thread of the worm gear 45 is formed in a right-hand thread shape, as shown in FIG. 2.

The rotating handle 40 is provided so as to protrude to the front side of the center beam 32 in a cross beam 31a on the front side and to the back side of the center beam 32 in a cross beam 31b on the back side and is made so as to be a crank handle having the worm gear 45 fixed to the shaft portion and rotating the worm gear 45 around the first axis P1.

Here, the rotating handle 40 may have a structure in which the rotating handle 40 is fitted to the worm gear 45 in a rotation transmission shape (for example, a spline, a key, a square bar, or the like) and is removed after the end of work, thereby not being attached to the vehicle during the travel of the vehicle.

Next, an operation of the transmission mechanism 42 will be described with reference to FIGS. 2, 4, and 5. In addition, since the transmission mechanism 42 operates in the same way for either of the cross beams 31, an operation thereof in the cross beam 31a on the front side will be described as a representative.

As shown in FIGS. 2 and 4, if a rotating force is applied by rotating the rotating handle 40 in a counterclockwise direction in the plane of FIG. 4 (a rotating force applying process S1), the rod 43 rotates through the worm wheel 46 in a direction in which a screw is tightened in a state where the male threaded portion 44 and the female threaded portion 34 are screwed to each other between the end beam 35 and the rod 43.

At this time, the pair of end beams 35 relatively move with respect to the center beam 32 so as to be pulled toward the inside in the width direction, and thus the pair of right and left guide wheels 39 move so as to come close to each other, whereby the distance between the guide wheels 39 is reduced. That is, in this embodiment, in the cross beam 31a on the front side, the male threaded portion 44 of the end beam 35 on the left side is made so as to be a right-hand thread and the male threaded portion 44 of the end beam 35 on the right side is made so as to be a left-hand thread.

On the other hand, if the rotating handle 40 is rotated in a clockwise direction in the plane of FIG. 4, the rod 43 rotates through the worm wheel 46 in a direction in which a screw loosens in a state where the male threaded portion 44 and the female threaded portion 34 are screwed to each other between the end beam 35 and the rod 43.

At this time, the pair of end beams 35 relatively move with respect to the center beam 32 so as to be pushed out toward the outside in the width direction, and thus the pair of right and left guide wheels 39 move so as to be spaced apart from each other, whereby the distance between the guide wheels 39 increases.

Figure 5:
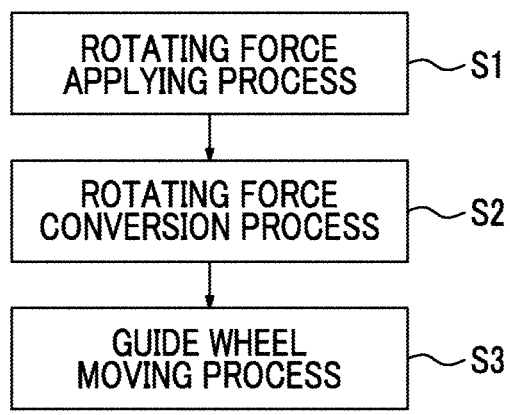
FIG. 5 is related to the guide-rail track vehicle according to the first embodiment of the present invention and is a flow diagram of a method for changing a distance between guide wheels.

That is, the transmission mechanism 42 converts the rotating force from the rotating handle 40 into a force in the width direction by a turnbuckle structure (a rotating force conversion process S2), as shown in FIG. 5, and operates the end beams 35 in the width direction, thereby moving the pair of right and left end beams 35 and the pair of right and left guide wheels 39 in the width direction in synchronization (a guide wheel moving process S3). In other words, a method for changing the distance between the guide wheels 39 includes the rotating force applying process S1, the rotating force conversion process S2, and the guide wheel moving process S3, thereby being able to change the distance between the guide wheels 39.

According to the vehicle 1 of this embodiment, it is possible to change the distance between the guide wheels by easily operating the end beams 35 in the width direction by the rotation of the rotating handle 40, and therefore, even in the track 100 in which the distance between the guide rails 101 is different, it is possible to cope with it without performing component replacement or the like.

In addition, by the transmission mechanism 42, the rotating force around the first axis P1 in the rotating handle 40 is converted into movement in the width direction, which is then transmitted to the end beams 35, and therefore, even if a load from the guide wheel 39 acts on the end beam 35 in the width direction during traveling, there is no case where the end beam 35 easily moves due to the acting force.

More specifically, in the transmission mechanism 42, a linear force and a rotating force are converted, and therefore, compared to a mechanism which does not perform such a conversion, an operation in the opposite direction does not easily occur. That is, when a force acts on the end beam 35 from the width direction, it is difficult for the force to be converted into the rotating force of the rotating handle 40, and thus a phenomenon does not easily occur in which the rotating handle 40 reversely rotates, whereby the distance between the guide wheels 39 changes. Therefore, it is possible to reliably fix the distance between the guide wheels 39 at the time of traveling.

Further, in the transmission mechanism 42, the worm gear 45 and the worm wheel 46 mesh with each other, and therefore, the twisting angle of the thread of the worm gear 45 is set to be smaller than an angle of repose, whereby a change in the distance between the guide wheels 39 due to the inverse rotation of the worm gear 45 does not occur even if a separate locking mechanism is not provided. Therefore, this also leads to a reduction in cost due to elimination of a locking mechanism.

In addition, in the transmission mechanism 42, the worm gear 45 and the worm wheel 46 mesh with each other and a force is mechanically transmitted by the rod 43, and therefore, the pair of right and left end beams 35 can be operated in synchronization. That is, compared to a case where a cylinder or the like using a fluid is applied to an operation of the end beam 35, the end beams 35 and the guide wheels 39 can be reliably operated in synchronization in a symmetrical fashion.

Therefore, since the positions of the guide wheels 39 do not become asymmetric in the width direction, there is no case where the running device 4 leans to one side, whereby a state where the running wheel 10 is inclined with respect to a direction of travel during straight traveling, curve traveling, or the like (a state where unnecessary side slip occurs) is created, and thus a load which is received from the track 100 increases or unbalance occurs, thereby reducing the durability of the guide wheel 39, and there is also no case where the vehicle 1 travels to be tilted (a skew state), and stable traveling becomes possible, and thus this also leads to improvement in ride quality.

Further, the rotating handle 40 and the transmission mechanism 42 are provided independently in the respective cross beams 31, and therefore, for example, it is also possible to make the distance between the guide wheels 39 in the cross beams 31 (the cross beam 31b on the back side of the running device 4a on the front side and the cross beam 31a on the front side of the running device 4b on the back side) which are located on the center side of the vehicle 1 smaller than the distance between the guide wheels 39 in the cross beams 31 (the cross beam 31a on the front side of the running device 4a on the front side and the cross beam 31b on the back side of the running device 4b on the back side) on the sides of the front and back end portions of the vehicle 1.

In this way, it is possible to apply a slip angle to the running wheels 10 while the vehicle 1 is traveling on a curved portion, and therefore, it becomes possible to reduce an acting force on the guide wheel 39 which is located on the outside of the curved portion by generating a cornering force toward the center of the curved portion. Accordingly, it is possible to extend the exchange life of the guide wheel 39.

Further, the distance between the guide wheels 39 can be easily changed, and therefore, the distance between the guide wheels 39 is reduced in a car shed, whereby it is also possible to increase the number of vehicles which are accommodated in the car shed, by effectively using a space in the car shed.

In addition, a ratchet handle provided with a ratchet mechanism may be used for the rotating handle 40 in this embodiment, and in this case, it is possible to more easily operate the rotating handle 40.

In addition, a bevel gear or the like may be used instead of the worm gear 45 and the worm wheel 46 in the transmission mechanism 42.

Second Embodiment

Figure 6:
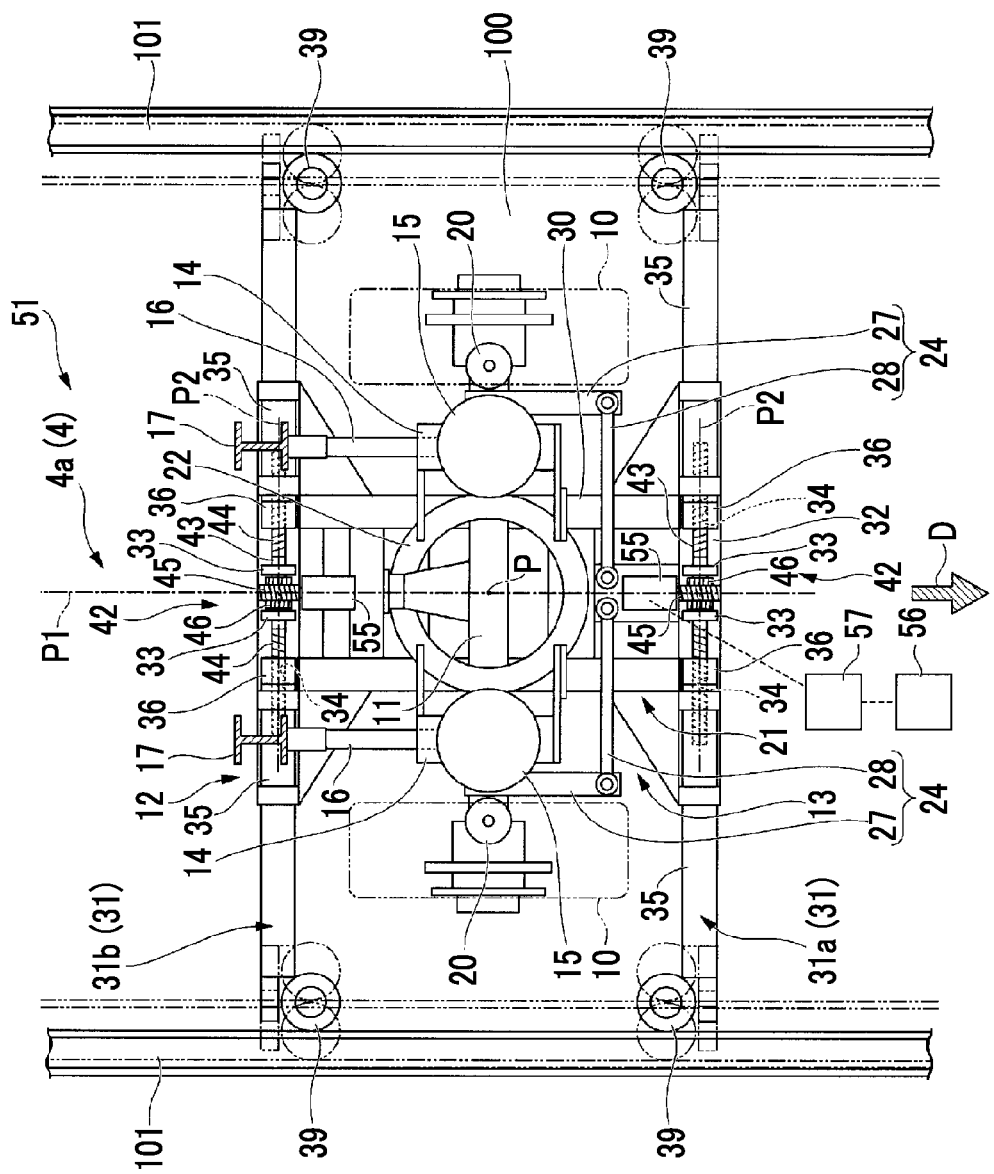
FIG. 6 is related to a guide-rail track vehicle according to a second embodiment of the present invention and is a top view showing a running device.

Next, a vehicle 51 according to a second embodiment of the present invention will be described with reference to FIG. 6.

Constituent elements shared by the first embodiment are denoted by the same reference numerals and a detailed description thereof is omitted.

The vehicle 51 of this embodiment has an electric motor 55 as substitute for the rotating handle 40, a signal output section 56 which outputs a signal indicating that a change in the distance between the guide wheels 39 is needed, and a control unit 57 which controls the electric motor 55 based on the signal.

The electric motors 55 are provided on the back side of the center beam 32 in the cross beam 31a on the front side and on the front side of the center beam 32 in the cross beam 31b on the back side, in the center beams 32 of the respective cross beams 31, and the worm gear 45 is fixed to an output shaft of each of the electric motors 55 and rotates around the first axis P1. In addition, an installation position of the electric motor 55 is not limited to the above-described case and the worm gear 45 may be rotated around the first axis P1 through another gear.

The signal output section is, for example, a switch provided in a driver's seat or the like in the carbody 2, a remote switch provided on the outside of the vehicle 1, or the like, and outputs a signal to the control unit 57 by operating the switch when it is necessary to change the distance between the guide wheels 39.

The control unit 57 receives the signal from the signal output section and operates the electric motor 55, thereby rotating the worm gear 45 around the first axis P1.

According to the vehicle 51 of this embodiment, by rotating the worm gear 45 by using the electric motor 55, it becomes possible to easily move the guide wheels 39, and since a remote operation of the electric motor 55 is also possible, it becomes possible to move the guide wheels 39 at a desired timing.

For example, by providing an adjustment section of the distance between the guide wheels 39 in a car shed and operating the above switch in the section, it is possible to perform the automatic adjustment of the distance between the guide wheels 39 so as to correspond to the distance between the guide rails 101, or the like.

Third Embodiment

Next, a vehicle 71 according to a third embodiment of the present invention will be described with reference to FIG. 7.

Constituent elements shared by the first embodiment and the second embodiment are denoted by the same reference numerals and a detailed description thereof is omitted.

The vehicle 71 of this embodiment has the same basic configuration as the vehicle 51 of the second embodiment and the configuration of a transmission mechanism 72 of a running device 74 (a running device 74a on the front side) is different from that of the second embodiment.

The transmission mechanism 72 is provided with a rod 75 which is fixed to the output shaft of the electric motor 55 and can rotate around the first axis P1 along with the output shaft, and a link member 80 mounted on the rod 75.

The rod 75 has a rod shape and extends along the traveling direction, and male threaded portions 76 are formed at two positions spaced apart from each other back and forth in the traveling direction. Then, in this embodiment, the male threaded portion 76 on one side is made so as to be a right-hand thread and the male threaded portion 76 on the other side is made so as to be a left-hand thread.

The link member 80 has a pair of first supporting sections 84 disposed to be spaced apart from each other back and forth in the traveling direction, a second supporting section 86 provided at each of the right and left end beams 35, and a connecting section 81 connecting the first supporting section 84 and the second supporting section 86.

Each of the first supporting sections 84 has a female threaded portion 85 formed on the inside, and the female threaded portion 85 of the first supporting section 84 on one side is made so as to be a right-hand thread and the female threaded portion 85 of the first supporting section 84 on the other side is made so as to be a left-hand thread. Then, the first supporting sections 84 are screwed to the corresponding male threaded portions 76 of the rod 75, whereby the rod 75 and the first supporting sections 84 can relatively rotate.

Each of the second supporting sections 86 is fixed to an end portion on the inside in the width direction in each of the right and left end beams 35. In this embodiment, each of the second supporting sections 86 is disposed at the exact center between the two first supporting sections 84 in front and back in the traveling direction. Conversely, the first supporting sections 84 are disposed so as to be in such a positional relationship. In addition, in this embodiment, the female threaded portions 34 described above are not formed in the end beams 35. In addition, the second supporting section 86 may be formed integrally with the end beam 35.

Here, in the cross beam 31a on the front side, the first supporting section 84 on one side is set to be a first supporting section 84a on the electric motor 55 side and the first supporting section 84 on the other side is set to be a first supporting section 84b on a side spaced apart from the electric motor 55. Further, the second supporting section 86 fixed to the end beam 35 on the left side is set to be a second supporting section 86a and the second supporting section 86 fixed to the end beam 35 on the right side is set to be a second supporting section 86b.

The connecting section 81 has four members: a first connecting rod 91 (a first connecting section) connecting the first supporting section 84a and the second supporting section 86a, a second connecting rod 92 (a second connecting section) connecting the first supporting section 84b and the second supporting section 86a, a third connecting rod 93 (a third connecting section) connecting the first supporting section 84a and the second supporting section 86b, and a fourth connecting rod 94 (a fourth connecting section) connecting the first supporting section 84b and the second supporting section 86b.

Here, the first connecting rod 91, the second connecting rod 92, the third connecting rod 93, and the fourth connecting rod 94 are members having substantially the same shape, and therefore, the first connecting rod 91 will be described as a representative.

The first connecting rod 91 connects the first supporting section 84a and the second supporting section 86a and is connected to the first supporting section 84a and the second supporting section 86a by connecting pins 95 extending along the orthogonal direction, thereby being able to relatively rotate between the first supporting section 84a and the second supporting section 86a with an axis along the orthogonal direction as the center. In addition, in this embodiment, the flange portions 33 described above are not provided at the center beam 32.

Next, an operation of the transmission mechanism 72 will be described. In addition, since the transmission mechanism 72 operates in the same way for either of the cross beams 31, an operation in the cross beam 31a on the front side will be described as a representative.

The electric motor 55 is operated by the control unit 57 in response to the signal from the signal output section 56 described above. In addition, in FIG. 7, the illustration of the signal output section 56 and the control unit 57 is omitted.

Figure 7:
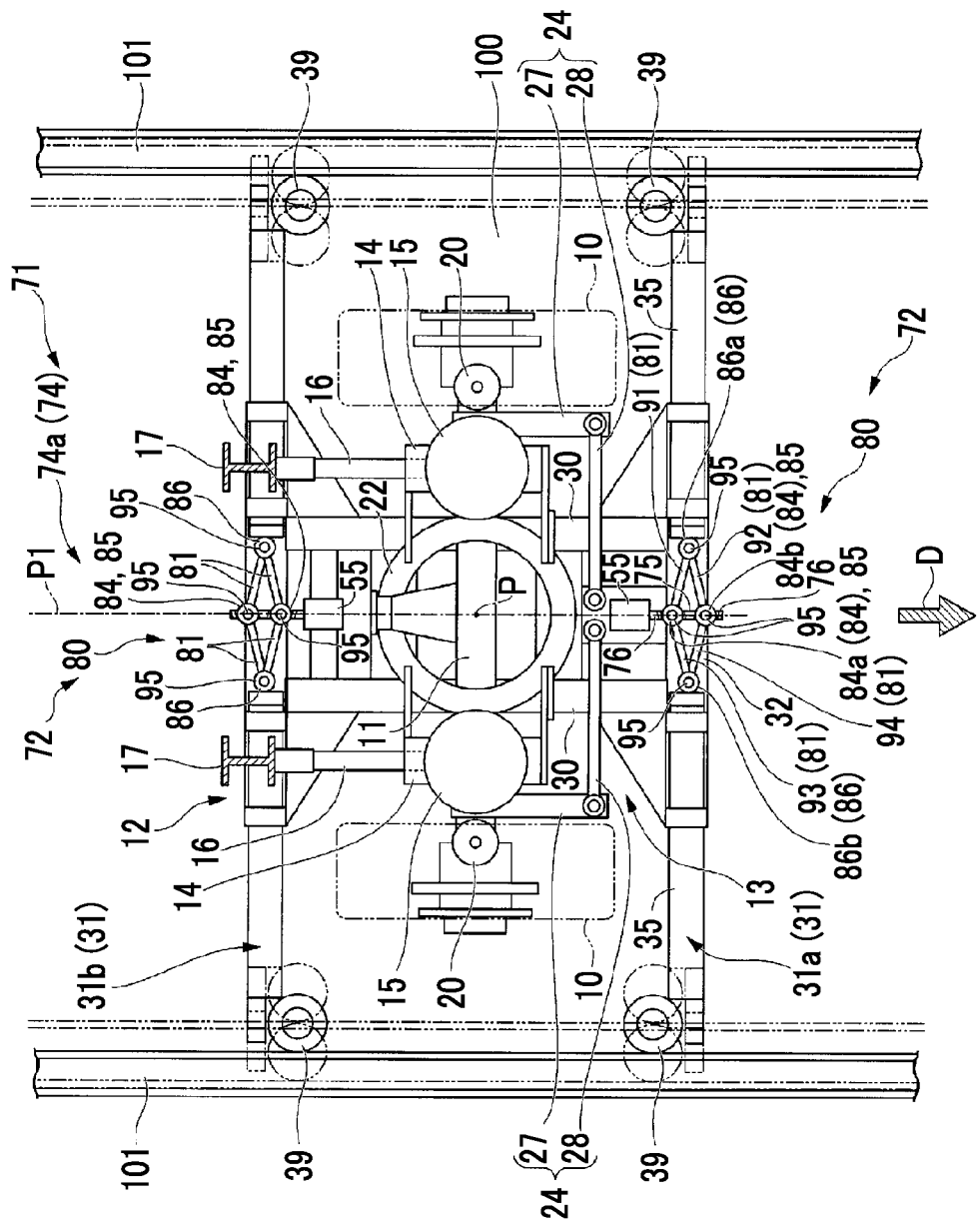
FIG. 7 is related to a guide-rail track vehicle according to a third embodiment of the present invention and is a top view showing a running device.

Then, for example, if the electric motor 55 rotates in a clockwise direction when viewed from the right side in the plane of FIG. 7, whereby a rotating force is applied to the rod 75 (the rotating force applying process S1 (refer to FIG. 5)), the rod 75 rotates, whereby the first supporting sections 84 move in a direction of approaching each other in a state where the female threaded portion 85 and the male threaded portion 76 are screwed to each other between the first supporting section 84 and the rod 75. That is, in this embodiment, in the cross beam 31*a* on the front side, the female threaded portion 85 of the first supporting section 84*a* is made so as to be a right-hand thread and the female threaded portion 85 of the first supporting section 84*b* is made so as to be a left-hand thread, and the male threaded portions 76 also correspond to these.

At this time, the first connecting rod 91 and the second connecting rod 92 operate such that an angle formed between the first connecting rod 91 and the second connecting rod 92 at the second supporting section 86 is reduced, while relatively rotating between the first supporting section 84 and the second supporting section 86.

Therefore, the second supporting section 86 moves so as to be pushed out toward the outside in the width direction by the first connecting rod 91 and the second connecting rod 92, and therefore, the end beam 35 on the left side moves to the outside in the width direction. Then, the third connecting rod 93 and the fourth connecting rod 94 also operate in the same way, and therefore, the pair of right and left guide wheels 39 move so as to be spaced apart from each other, whereby the distance between the guide wheels 39 increases.

On the other hand, if the electric motor 55 and the rod 75 rotate in a counterclockwise direction when viewed from the right side in the plane of FIG. 7, the first supporting sections 84 move in a direction away from each other in a state where the female threaded portion 85 and the male threaded portion 76 are screwed to each other between the first supporting section 84 and the rod 75.

At this time, the first connecting rod 91 and the second connecting rod 92 operate such that an angle formed between the first connecting rod 91 and the second connecting rod 92 at the second supporting section 86 increases, while relatively rotating between the first supporting section 84 and the second supporting section 86.

Therefore, the second supporting section 86 moves so as to be pulled toward the inside in the width direction by the first connecting rod 91 and the second connecting rod 92, and therefore, the end beam 35 on the left side moves to the inside in the width direction. Then, the third connecting rod 93 and the fourth connecting rod 94 also operate in the same way, and therefore, the pair of right and left guide wheels 39 move so as to come close to each other, whereby the distance between the guide wheels 39 is reduced.

That is, the transmission mechanism 72 converts the rotating force from the electric motor 55 into a force in the width direction by a turnbuckle structure (the rotating force conversion process S2 (refer to FIG. 5)) and operates the end beams 35 in the width direction, thereby moving the pair of right and left end beams 35 and the pair of right and left guide wheels 39 in the width direction in synchronization (the guide wheel moving process S3 (refer to FIG. 5)).

According to the vehicle 71 of this embodiment, the rotation of the rod 75 is converted into movement in the width direction through the link member 80. For this reason, the transmission mechanism 72 is strong against a load from the width direction, and thus it is possible to more reliably fix the distance between the guide wheels 39. Further, due to an operation by a mechanical mechanism using the link member 80 in this manner, it is possible to reliably operate a pair of beam members in synchronization, thereby symmetrically moving the right and left guide wheels 39.

Here, in this embodiment, similar to the second embodiment, the electric motor 55 is used. However, instead of the electric motor 55, for example, the rotating handle 40 of the first embodiment may be used.

Preferred embodiments of the present invention have been described above. However, the present invention is not limited to the above-described embodiments. Additions, omissions, substitution, and other changes in the configuration are possible within a scope which does not depart from the gist of the present invention. The present invention is not limited by the above description and is limited by only the scope of the appended claims.

Figure 8:
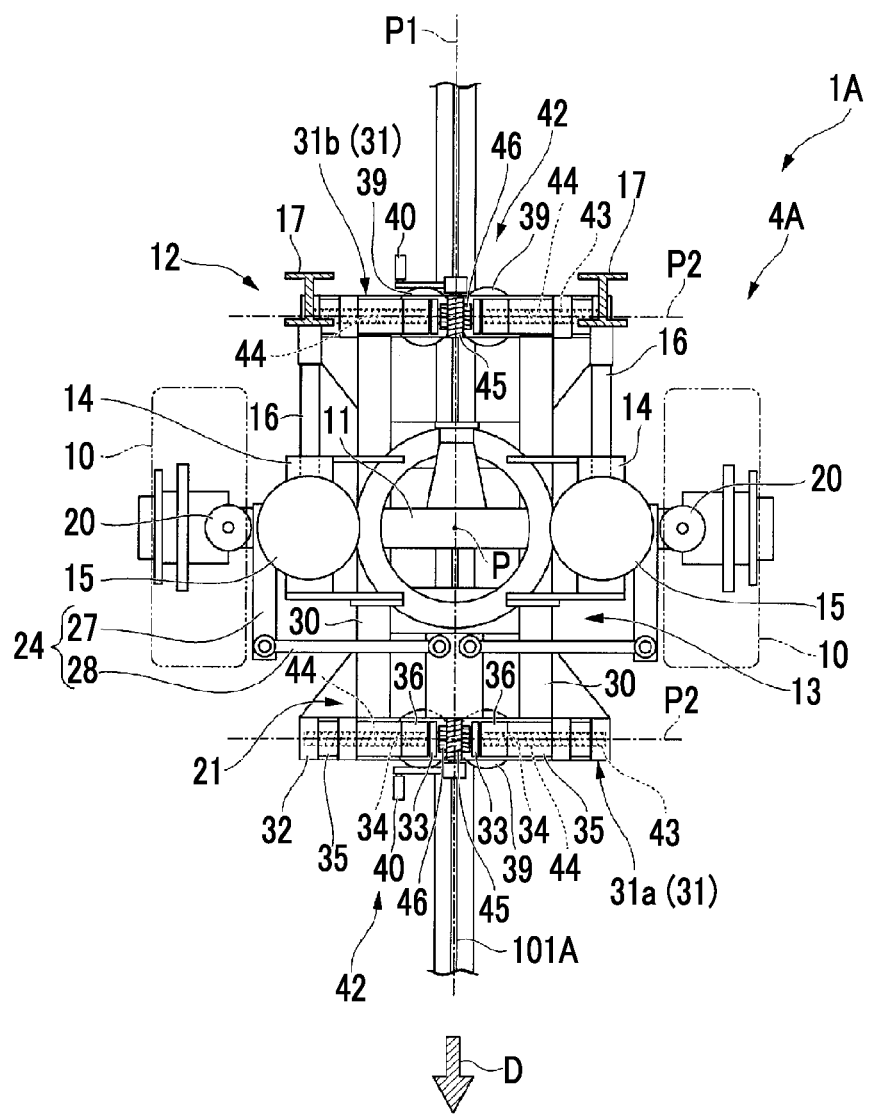
FIG. 8 is related to a guide-rail track vehicle according to a modified example of an embodiment of the present invention and is a top view showing a running device.

For example, in the embodiments described above, the vehicles 1, 51, and 71 of a lateral guide rail type transportation system in which the guide rails 101 are provided on the right and left sides in the width direction of the track 100 have been described. However, the configurations of the above-described embodiments may be applied to a center guide type transportation system in which a guide rail 101A is provided at the middle position in the width direction of the track 100, as shown in FIGS. 8 and 9.

That is, in a running device 4A, the guide wheels 39 are provided so as to sandwich the guide rail 101A therebetween from the width direction in the end beams 35 of the cross beam 31 and the positions of the guide wheels 39 are adjusted by operating the end beams 35 in the width direction through the transmission mechanism 42 by the rotating handle 40. Accordingly, for example, even if the guide wheels 39 are worn, thereby being unable to travel in a state where the guide rail 101A is reliably sandwiched between the guide wheels 39, it becomes possible to reliably guide a vehicle 1A by easily adjusting the positions of the guide wheels 39.

Figure 9:
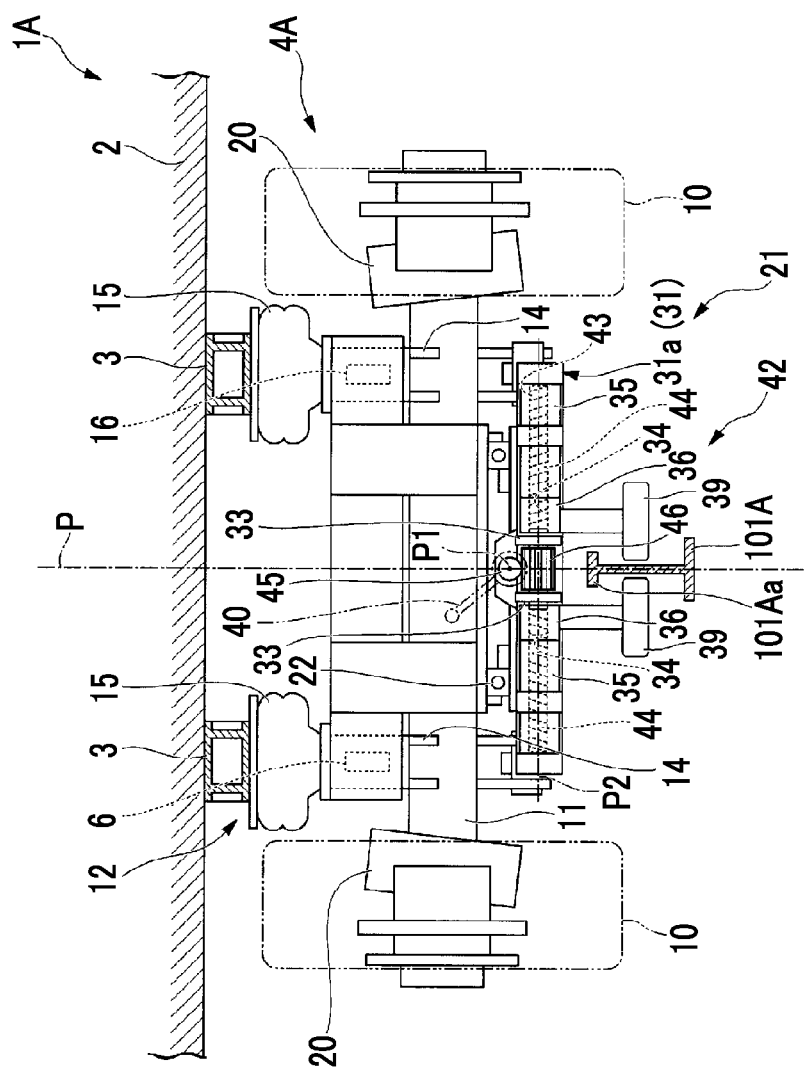
FIG. 9 is related to the guide-rail track vehicle according to the modified example of an embodiment of the present invention and is a front view showing the running device.

Further, when the need to lift the vehicle 1A in the track 100 or a car shed arises, an upper flange 101Aa of the guide rail 101A comes in the way, as can be seen in a cross-sectional view of FIG. 9, and therefore, it is necessary to remove the guide wheels 39 or remove the guide rail 101A. However, according to the present invention, work can be performed smoothly in a short time only by widening the distance between the guide wheels 39.

In addition, also in such a center guide type transportation system, a configuration using the electric motor 55 as in the second embodiment or a configuration using the transmission mechanism 72 of the third embodiment may be adopted.

INDUSTRIAL APPLICABILITY

The present invention relates to a guide-rail track vehicle which travels on a track. According to the guide-rail track vehicle related to the present invention, by using the transmission part for converting rotational movement into linear movement in the width direction, it is possible to easily change the distance between the guide wheels and reliably fix the positions of the guide wheels.

REFERENCE SIGNS LIST

1: vehicle
2: carbody
3: underframe
4 (4*a*, 4*b*): running device
10: running wheel
11: axle
12: suspension device
13: steering guide device
14: spring receiver
15: air spring 16: link
17: suspension frame
20: kingpin
21: guide frame
22: center bearing
24: steering link mechanism
27: steering arm
28: steering rod
30: longitudinal beam
31 (31a, 31b): cross beam
32: center beam
33: flange portion
34: female threaded portion (second threaded portion)
35: end beam (beam member)
36: nut member
39: guide wheel
39a: switching guide wheel
40: rotating handle (rotating part)
42: transmission mechanism (transmission part)
43: rod
44: male threaded portion (first threaded portion)
45: worm gear (first gear)
46: worm wheel (second gear)
51: vehicle
55: electric motor
56: signal output section
57: control unit
71: vehicle
72: transmission mechanism
74 (74a): running device
75: rod
80: link member
76: male threaded portion
81: connecting section
84 (84a, 84b): first supporting section
85: female threaded portion
86 (86a, 86b): second supporting section
91: first connecting rod
92: second connecting rod
93: third connecting rod
94: fourth connecting rod
95: connecting pin
100: track
101: guide rail
1A: vehicle
4A: running device
101A: guide rail
101Aa: upper flange
P: center axis
P1: first axis
P2: second axis
S1: rotating force applying process
S2: rotating force conversion process
S3: guide wheel moving process

The invention claimed is:

1. A guide-rail track vehicle which travels on a track, comprising:
a carbody which is disposed at an upper portion of a vehicle; and
a running device which supports the carbody from below and has a guide frame on which at least a pair of guide wheels that are guided by a guide rail provided at the track are mounted,
wherein the guide frame has
a pair of beam members which can slide in a width direction of the track and on which the respective guide wheels are mounted,
a rotating part capable of rotating around a first axis along a traveling direction, and
a transmission part which converts rotation of the rotating part into movement in the width direction and symmetrically moves the guide wheels by synchronizing the pair of beam members, wherein
the transmission part has
a first gear which is fixed to the rotating part and can rotate around the first axis,
a second gear which meshes with the first gear, thereby rotating around a second axis along the width direction according to rotation of the first gear, and
a rod which is fixed to the second gear, extends in the width direction, has first threaded portions formed on sides of both end portions, and rotates along with the second gear, and
in each of the pair of beam members, a second threaded portion which is screwed to the first threaded portion is formed such that the pair of beam members come close to each other if the rod rotates to one side in a state where the first threaded portion is screwed and that the pair of beam members are spaced apart from each other if the rod rotates to the other side.

2. The guide-rail track vehicle according to claim 1, wherein the first gear is a worm gear, and
the second gear is a worm wheel.

3. The guide-rail track vehicle according to claim 1, wherein the rotating part has
an electric motor which supplies power to the transmission part,
a signal output section which outputs a signal when the movement of the guide wheels is required, and
a control unit which controls an operation of the electric motor according to the signal from the signal output section.

4. A guide-rail track vehicle which travels on a track, comprising:
a carbody which is disposed at an upper portion of a vehicle; and
a running device which supports the carbody from below and has a guide frame on which at least a pair of guide wheels that are guided by a guide rail provided at the track are mounted,
wherein the guide frame has
a pair of beam members which can slide in a width direction of the track and on which the respective guide wheels are mounted,
a rotating part capable of rotating around a first axis along a traveling direction, and
a transmission part which converts rotation of the rotating part into movement in the width direction and symmetrically moves the guide wheels by synchronizing the pair of beam members, wherein
the transmission part has
a rod which is fixed to the rotating part and can rotate around the first axis and in which a threaded portion is formed, and
a link member mounted on the rod, and
the link member has
a pair of first supporting sections which are screwed to the threaded portion, are disposed to be spaced apart from each other in the traveling direction, and come close to each other if the rod rotates to one side and are spaced apart from each other if the rod rotates to the other side,
a pair of second supporting sections respectively fixed to the pair of beam members on both sides in the width direction, a first connecting section which connects the first supporting section on one side and the second supporting section on one side and is provided so as to be able to relatively rotate with an axis along an orthogonal direction orthogonal to the traveling direction and the width direction as the center, between the first supporting section on one side and the second supporting section on one side, a second connecting section which connects the first supporting section on the other side and the second supporting section on one side and is provided so as to be able to relatively rotate with an axis along the orthogonal direction as the center, between the first supporting section on the other side and the second supporting section on one side, a third connecting section which connects the first supporting section on one side and the second supporting section on the other side and is provided so as to be able to relatively rotate with an axis along the orthogonal direction as the center, between the first supporting section on one side and the second supporting section on the other side, and a fourth connecting section which connects the first supporting section on the other side and the second supporting section on the other side and is provided so as to be able to relatively rotate with an axis along the orthogonal direction as the center, between the first supporting section on the other side and the second supporting section on the other side.

5. A method for changing a distance between guide wheels, which is for changing the distance between at least a pair of guide wheels which are mounted on a running device, which supports a carbody disposed at an upper portion of a guide-rail track vehicle travelling on a track from below, are guided by a guide rail provided at the track, and provided so as to be able to slide in a width direction of the track, the method comprising:

a rotating force applying process of applying a rotating force around a first axis along a traveling direction of the running device;

a rotating force conversion process of converting the rotating force into a force in the width direction; and a guide wheel moving process of symmetrically moving the pair of guide wheels in the width direction in synchronization by the force in the width direction, wherein in the rotating force conversion process, the rotating force is converted into the force in the width direction by using a first gear which is provided in the running device and can rotate around the first axis, a second gear which meshes with the first gear, thereby rotating around a second axis along the width direction according to rotation of the first gear, a rod which is fixed to the second gear, extends in the width direction, has first threaded portions formed on sides of both end portions, and rotates along with the second gear, and a pair of beam members on which the pair of guide wheels are respectively mounted, and in each of which a second threaded portion which is screwed to the first threaded portion is formed such that the pair of guide wheels come close to each other if the rod rotates to one side in a state where the first threaded portion is screwed and that the pair of guide wheels are spaced apart from each other if the rod rotates to the other side.

6. The method for changing a distance between guide wheels according to claim 5, wherein in the rotating force applying process, the rotating force is applied by using an electric motor which supplies rotation power around the first axis, and a control unit which controls an operation of the electric motor according to a signal from a signal output section which outputs the signal when the movement of the guide wheels is required.

7. A method for changing a distance between guide wheels, which is for changing the distance between at least a pair of guide wheels which are mounted on a running device, which supports a carbody disposed at an upper portion of a guide-rail track vehicle travelling on a track from below, are guided by a guide rail provided at the track, and provided so as to be able to slide in a width direction of the track, the method comprising:

a rotating force applying process of applying a rotating force around a first axis along a traveling direction of the running device;

a rotating force conversion process of converting the rotating force into a force in the width direction; and a guide wheel moving process of symmetrically moving the pair of guide wheels in the width direction in synchronization by the force in the width direction, wherein in the rotating force conversion process, the rotating force is converted into the force in the width direction by using a rod which is provided in the running device and can rotate around the first axis and in which a threaded portion is formed, a pair of first supporting sections which are mounted on the rod so as to be screwed to the threaded portion, are disposed to be spaced apart from each other in the traveling direction, and come close to each other if the rod rotates to one side and are spaced apart from each other if the rod rotates to the other side, a pair of second supporting sections respectively fixed to a pair of beam members, on which the pair of guide wheels are respectively mounted, on both sides in the width direction, a first connecting section which connects the first supporting section on one side and the second supporting section on one side and is provided so as to be able to relatively rotate with an axis along an orthogonal direction orthogonal to the traveling direction and the width direction as the center, between the first supporting section on one side and the second supporting section on one side, a second connecting section which connects the first supporting section on the other side and the second supporting section on one side and is provided so as to be able to relatively rotate with an axis along the orthogonal direction as the center, between the first supporting section on the other side and the second supporting section on one side, a third connecting section which connects the first supporting section on one side and the second supporting section on the other side and is provided so as to be able to relatively rotate with an axis along the orthogonal direction as the center, between the first supporting section on one side and the second supporting section on the other side, and a fourth connecting section which connects the first supporting section on the other side and the second supporting section on the other side and is provided so as to be able to relatively rotate with an axis along the orthogonal direction as the center, between the first supporting section on the other side and the second supporting section on the other side.

* * * * *